United States Patent [19]

Nonogaki et al.

[11] Patent Number: 5,279,134
[45] Date of Patent: Jan. 18, 1994

[54] OPERATION PANEL WITH A DISPLAY UNIT FOR USE IN WASHING MACHINES

[75] Inventors: Takashi Nonogaki, Ichinomiya; Takashi Nishimura, Seto, both of Japan

[73] Assignee: Kabushiki Kaisha Toshiba, Kawasaki, Japan

[21] Appl. No.: 992,078

[22] Filed: Dec. 17, 1992

[30] Foreign Application Priority Data

Dec. 25, 1991 [JP] Japan .................................. 3-342796

[51] Int. Cl.⁵ ............................................. D06F 33/02
[52] U.S. Cl. .................................... 68/12.27; 345/168
[58] Field of Search ................ 68/12.27; 134/113; 340/712

[56] References Cited

U.S. PATENT DOCUMENTS 4,231,130 11/1980 Tobita et al. .................... 68/12.27 X
4,676,077 6/1987 Hirooka et al. ...................... 68/12.27

FOREIGN PATENT DOCUMENTS

228897 10/1986 Japan .................................. 68/12.27
158994 6/1989 Japan .................................. 68/12.27
2-255183 10/1990 Japan .................................. 68/12.27
3-219031 9/1991 Japan .................................. 68/12.27

*Primary Examiner*—Philip R. Coe
*Attorney, Agent, or Firm*—Limbach & Limbach

[57] ABSTRACT

An operation panel for use in a washing machine includes a display unit with a circular liquid crystal display having a central display section for displaying the name of a washing course and circumferential display sections for displaying the names of steps of the washing course and an electrically conductive transparent sheet disposed on the display screen of the display unit. The conductive sheet has portions corresponding to the display sections of the display unit respectively. Selecting switching elements responsive to the touch of user's finger are formed on these portions of the conductive sheet.

10 Claims, 10 Drawing Sheets

OPERATION PANEL WITH A DISPLAY UNIT FOR USE IN WASHING MACHINES

BACKGROUND OF THE INVENTION

1. Field of the invention

This invention relates to an operation panel with a display unit for use in washing machines, and more particularly to such an operation panel in which names of selected wash, rinse and other steps and progress of each selected step are displayed on the display unit.

2. Description of the prior art

Conventionally, a washing machine comprises an operation panel mounted on its upper portion and various operation switches are provided on the operation panel. These operation switches include a switch for selecting one of a plurality of washing courses having working contents different from one another, switches for setting execution time periods of wash and dehydration steps respectively, and a switch for selecting the number of times of the rinsing. The operation panel further includes light emitting diodes (LED's) for indicating the progress of each step of the selected washing course.

In the conventional washing machine, however, it is difficult for a user to understand whether or not the contents of the selected washing course correspond to those desired. Second, it is difficult to understand the relevancy between the contents of each step to be executed in the selected washing course and operation members for selecting each step. Third, it is difficult to understand changed contents of each step when each step is selected. Fourth, the operation panel is too large in size.

SUMMARY OF THE INVENTION

Therefore, an object of the present invention is to provide an improved operation panel with a display unit for the washing machine, wherein the selection of the wash, rinse and other steps can be performed directly on a display screen of the display unit on which the name of the step is on display so that the selection of the steps of the washing course can be performed readily.

The present invention provides an operation panel for use in a washing machine, comprising a display unit having a display screen on which contents of a washing course including wash and rinse steps is displayed, touch detecting means for detecting an external touch to a part of the display screen of the display unit, which part corresponds to each step of the washing course, means responsive to detection by the touch detecting means for selecting a desirable step and changing contents of a step on display from contents of a previously selected step to contents of a currently selected step, and means for controlling the display unit so that progress of the step in execution is displayed on the display screen of the display unit.

In accordance with the present invention, the selected washing course including a series of steps such as wash and rinse is displayed on the display unit. Consequently, the executed contents of the selected washing course can be understood at a glance. Further, the executed contents of each step of the selected washing course can be selected by externally touching the portion of the display screen on which each step is on display. The operation for selection of the executed contents of each step is thus direct and can be performed readily. In this case, furthermore, the changing contents of each step are displayed on the display unit and accordingly, the changed contents of each step can be definitely understood. Additionally, since the keys or switches are not necessary for selection of the executed contents of each step of the washing course, they need not be provided on the operation panel, which prevents it from being rendered large-sized.

It is preferable that the display unit comprise a liquid crystal display including a display screen having a circular configuration and that the display screen be divided into a plurality of display sections circumferentially arranged on the display screen. Further, it is preferable that the display sections of the display unit correspond to the displayed steps of the washing course and that the touch detecting means comprise a plurality of switching elements provided in the display sections of the display unit respectively. In this case, each switching element preferably comprises transparent electrodes disposed on the display screen of the display unit.

Furthermore, it is preferable that the progress of the step in execution be displayed in a pattern that an area of the display screen allotted to each step is changed with lapse of an execution time period of each step.

Additionally, it is preferable that the operation panel further comprise clock display instruction means and that the clock display instruction means controls the display unit comprising the liquid crystal display in response to a suitable operation so that an analog clock pattern is displayed on the display screen, the analog clock pattern including clock short and long hands moved with progress of time.

Other objects of the present invention will become obvious upon understanding of the illustrative embodiments about to be described. Various advantages not referred to herein will occur to those skilled in the art upon employment of the invention in practice.

BRIEF DESCRIPTION OF THE DRAWINGS

Two embodiments of the invention will be described with reference to the accompanying drawings in which:

FIG. 3 is an exploded perspective view of the display unit, electrode sheets and the like;

DESCRIPTION OF THE PREFERRED EMBODIMENT

Figure 1:
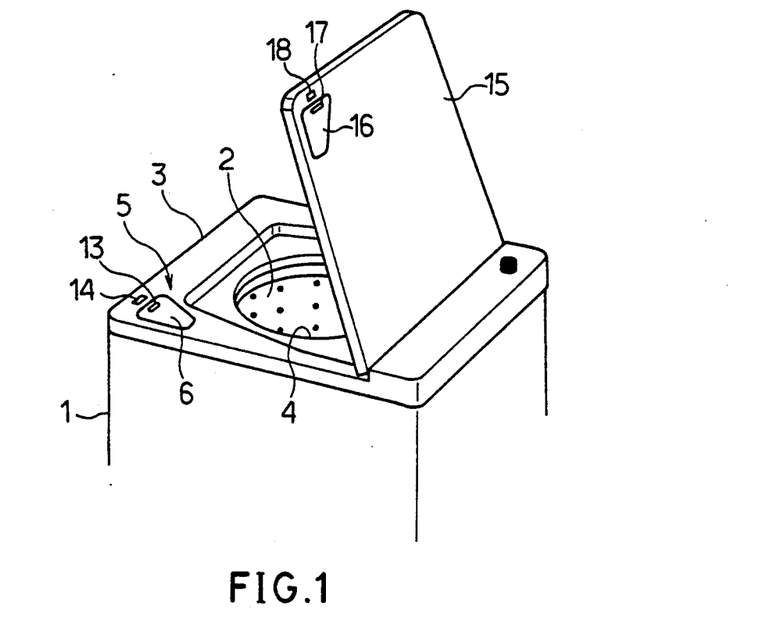
FIG. 1 is a perspective view of an upper portion of a washing machine incorporating the operation panel of a first embodiment of the invention.
Figure 2:
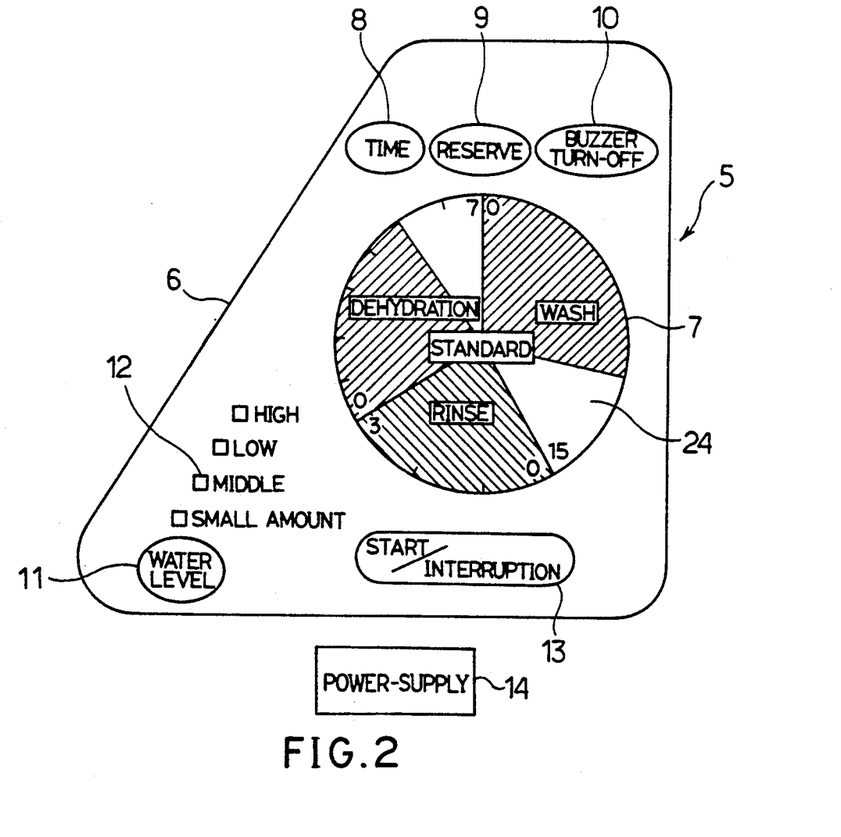
FIG. 2 is a plan view of the operation panel.

A first embodiment of the present invention will be described with reference to. FIGS. 1 through 13. FIG. 1 illustrates an upper portion of a washing machine incorporating the operation panel in accordance with the invention. An outer cabinet 1 encloses a wash tub 2 also serving as a dehydration tub. A top cover 3 having a central access opening 4 is mounted on the top of the outer cabinet 1. An operation panel 5 is provided on a front right-hand corner of the top cover 3. As shown in FIG. 2, the operation panel 5 generally has the shape of an isosceles triangle and includes a generally circular display unit 7 provided on its generally central portion. A TIME key 8, a RESERVE key 9 and a BUZZER TURN-OFF key 10 are provided at the rear side of the display unit 7 on the operation panel 5. The TIME key 8 serves as clock display instruction means which will be described later. The operation panel 5 further includes a WATER LEVEL key 11, light emitting diodes (LED's) indicating water levels of HIGH, MIDDLE, LOW and SMALL AMOUNT respectively and a START/INTERRUPTION key 13. A POWER-SUPPLY button 14 is provided outside the operation panel 5 on the top cover 3. A lid 15 is pivotally mounted on the top cover 3. The lid 15 has a window 16 through which a user can view the operation panel 5 even in the condition that the lid 15 is closed. The lid 15 further has operation buttons 17 and 18 corresponding to the START/INTERRUPTION key 13 and the POWER-SUPPLY button 14 respectively. The START/INTERRUPTION key 13 and the POWER SUPPLY button 14 can be operated by operating the operation buttons 17, 18 respectively even in the condition that the lid 15 is closed.

Figure 4:
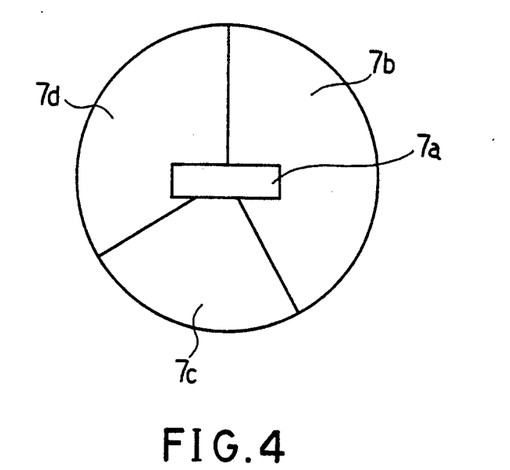
FIG. 4 is a plan view of display sections of the display unit.

The display unit 7 comprises a liquid crystal display. As shown in FIG. 4, a liquid crystal screen of the display unit 7 is divided into a plurality of display sections 7a through 7d. The display section 7a is positioned in the center of the display screen and the other sections 7b-7d are arranged circumferentially. The central display section 7a is provided for displaying one of three washing courses, STANDARD, STUBBORN and WOOL, for example, and the circumferential display sections 7b-7d are provided for displaying, in the shape of a pie chart, steps, time periods and number of times of execution of the respective steps. Thus, the contents of each step can be displayed on the display unit 7. The display unit 7 is further designed to change its display mode of the display screen to display an image of an analog clock.

Figure 3:
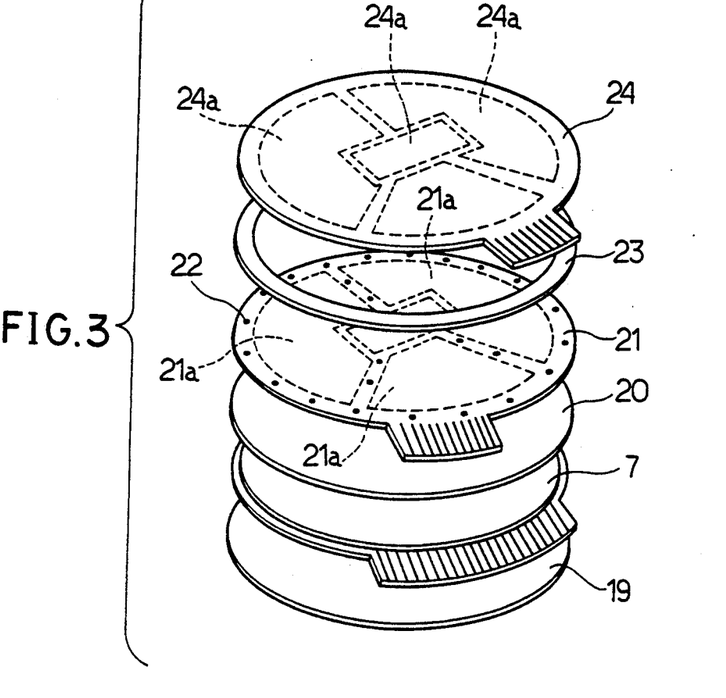

A back light 19 is provided on the underside of the display unit 7, as shown in FIG. 3. A transparent reinforcement plate 20 is provided on the upper side of the display unit 7 and a soft lower transparent electrode sheet 21 is provided on the reinforcement plate 20. The lower electrode sheet 21 has a number of spacers 22 formed on it and an annular frame spacer 23 is disposed on the lower electrode sheet 21. A soft upper transparent electrode sheet 24 is provided on the frame spacer 23. The electrode sheets 21, 24 have a plurality of electrode portions 21a, 24a respectively. When a user externally touches each electrode portion 24a of the electrode sheet 24 with his or her finger, the touched electrode portion 24a is brought into contact with the corresponding electrode portion 21a of the lower electrode sheet 21, whereby an external touch operation is detected. Thus, the upper and lower electrode sheets 24, 21 serve as touch detecting means for detecting the external touch operation. The electrode portions 24a, 21a of the upper and lower electrode sheets 24, 21 correspond to the display sections 7a-7d of the display screen of the display unit 7 shown in FIG. 4 in the shape and position, respectively.

Figure 5:
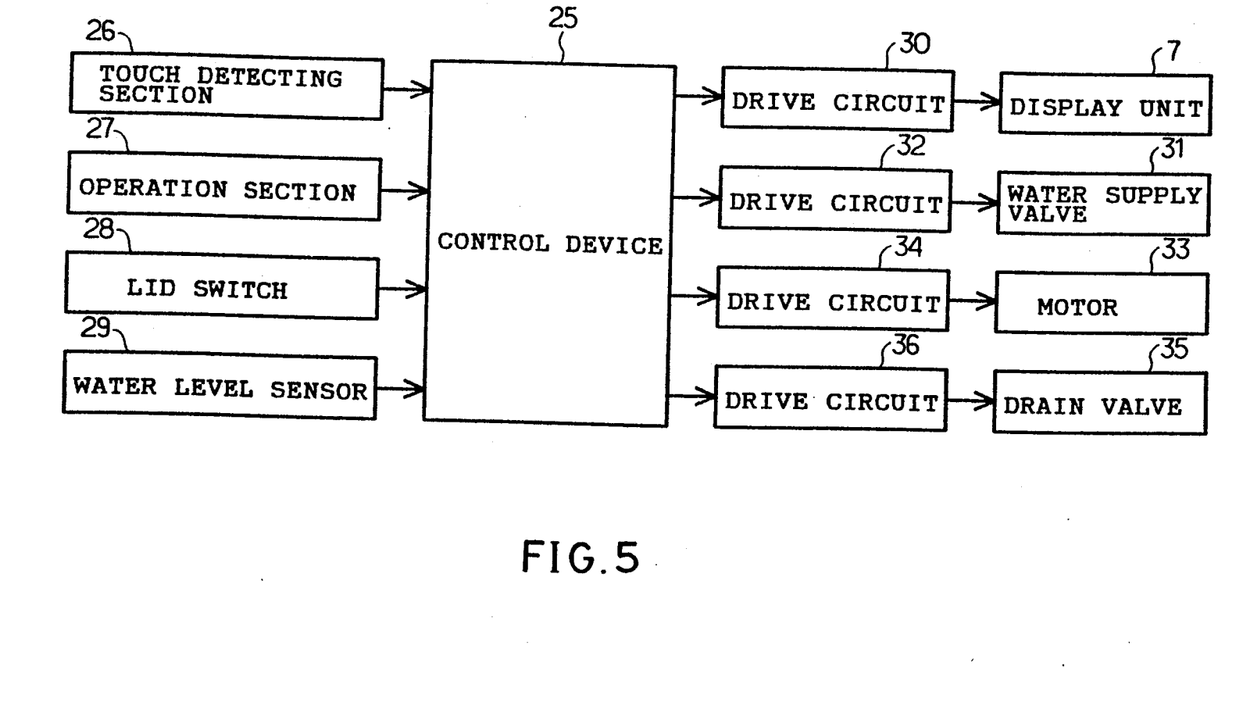
FIG. 5 is a block diagram of the washing machine.

A control device 25 as shown in FIG. 5 is provided below the operation panel 5 in the top cover 3. The control device 25 comprises a microcomputer and serves as control means. The control device 25 is supplied with a detection signal from a touch detecting section 26 comprising the electrode portions 24a of the upper electrode sheet 24 and the electrode portions 21a of the lower electrode sheet 21. The control device 25 is also supplied with operation signals from an operation section 27 including the keys 8-10, 12, 13 and the POWER-SUPPLY button 14. The control device 25 is further supplied with a switch signal from a lid switch 28 responsive to the opening and closing of the lid 15 and a water level signal from a water level sensor 29 sensing the water level in the wash tub 2. Data of a control program is previously stored in the control device 25. Based on the above-described inputs and the control program, the control device 25 supplies drive control signals to a drive circuit 30 for operating the display unit 7, a drive circuit 32 for operating a water supply valve 31 supplying water into the wash tub 2, a drive circuit 34 for operating a wash and dehydration motor 33, and a drive circuit 36 for operating a drain valve 35 discharging the wash tub 2.

Figure 6:
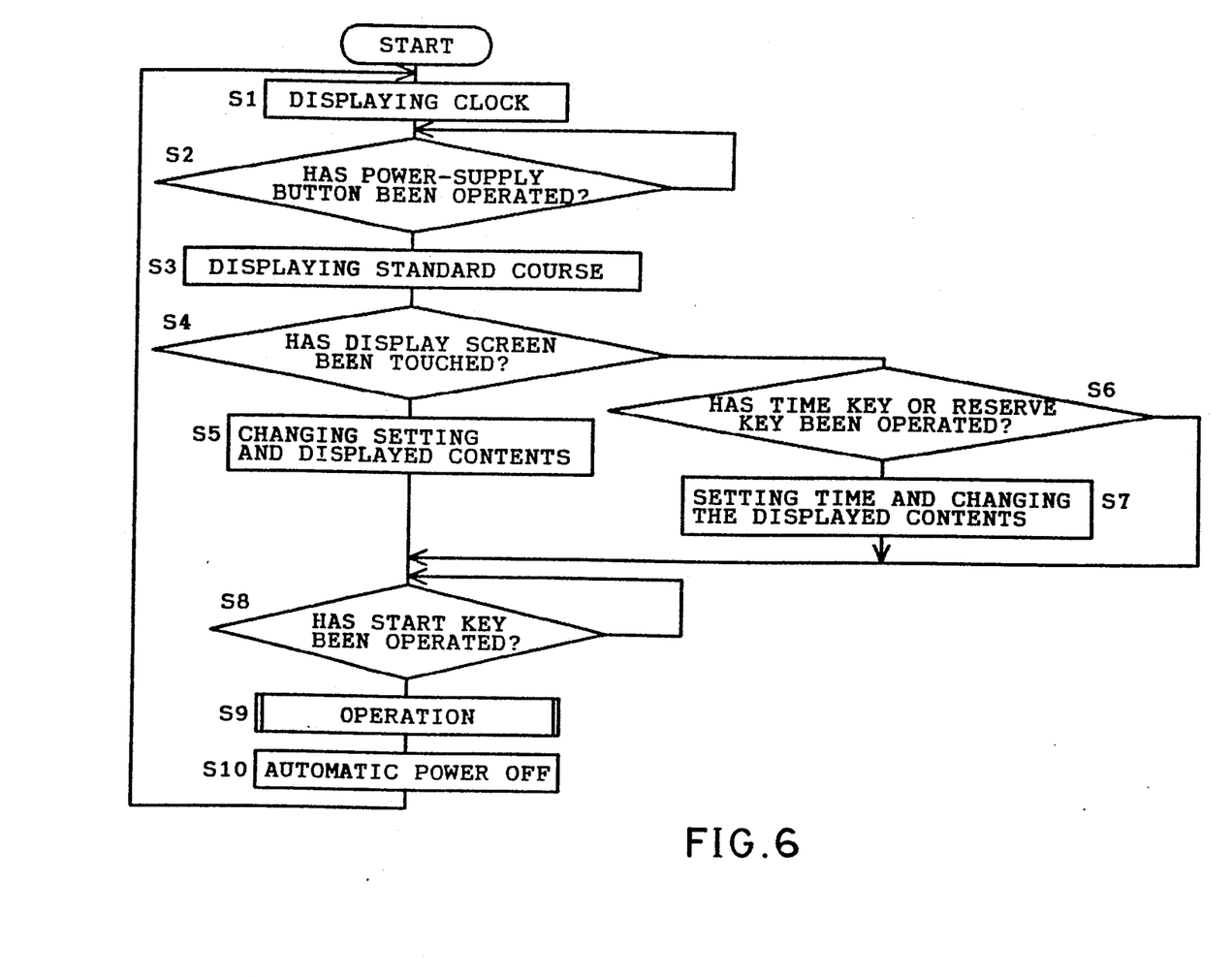
FIG. 6 is a flowchart explaining the operation of the washing machine.
Figure 7:
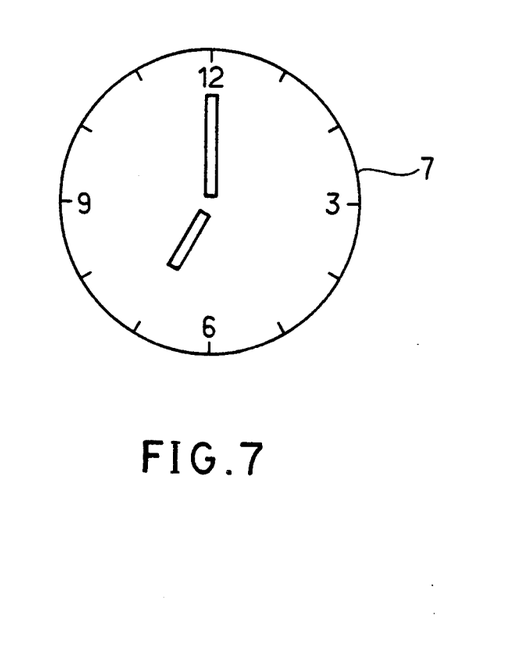
FIG. 7 is a plan view of the display unit in the clock display mode.
Figure 8:
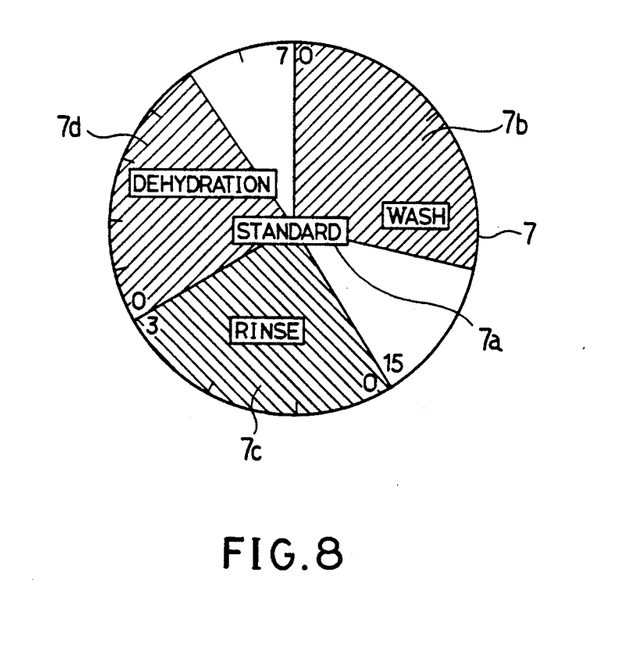
FIG. 8 is a plan view of the display unit displaying a STANDARD course.

The control manner of the control device 25 will now be described. The clock image is displayed on the display unit 7 when a plug (not shown) is connected to a power-supply receptacle, as shown in FIG. 6 (step S1). The displayed clock is in an analog mode as is shown in FIG. 7. An image of the clock long needle advances one scale of a minute every time the time advances one minute and an image of the clock short needle advances one scale of a minute every time the time advances one hour, as usual in ordinary clocks. Contours of the display sections 7a-7d are not displayed in this clock display mode. Subsequently, it is determined whether the POWER-SUPPLY button 14 has been operated or not (step S2). When it is determined that the POWER-SUPPLY button 14 has been operated, the name of the washing course or STANDARD, is displayed on the display unit 7 by an automatic selecting function (step S3). FIG. 8 illustrates a manner of displaying the name of the washing course, STANDARD. The display unit 7 displays, in its central display section 7a, the name of the washing course, STANDARD. The display unit 7 further displays, in its circumferential display sections 7b-7d, the names of the steps or WASH, RINSE and DEHYDRATION respectively. Also, a predetermined range of the display section 7b is colored so that an execution time period of 10 minutes is indicated. Further, a predetermined range of the display section 7c is colored so that the number of execution times of the rinse operation or three times is indicated. A predetermined range of the display section 7d is colored so that an execution time period of 5 minutes is indicated. Scales of these execution time periods and the number of the execution times are also displayed with the color indications. Regarding the color indications, each corresponding scale section may be blackened, for example.

Figure 9:
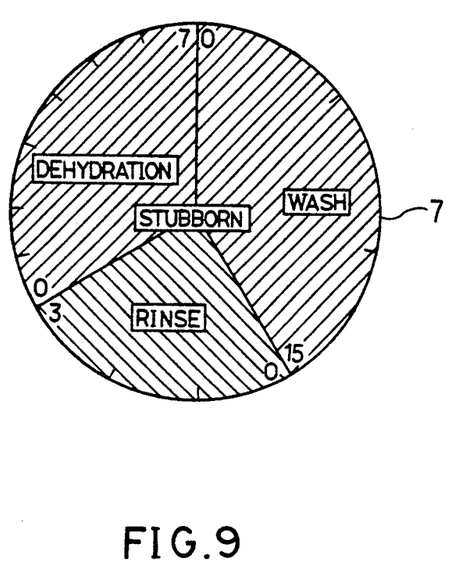
FIG. 9 is a plan view of the display unit displaying a STUBBORN SOIL course.

Subsequently, it is determined whether the display screen of the display unit 7 is externally touched or not (step S4). When the portion of the display screen on which the washing-course name, STANDARD is displayed is touched by the user, this is detected by the touch detecting section 26. The control device 25 operates to switch the washing course from STANDARD to STUBBORN and simultaneously, the name of washing course, STUBBORN is displayed on the display section 7a of the display unit 7 (step S5). FIG. 9 illustrates the contents of the washing course, STUBBORN. The name of the washing course, STUBBORN, is displayed on the central display section 7a of the display screen of the display unit 7. In the circumferential display sections 7b–7d of the display screen, the names of the steps to be executed, that is, WASH, RINSE and DEHYDRATION are displayed on the display sections 7b–7d respectively. Also, the display section 7b is colored so that an execution time period of 15 minutes is indicated. Further, the display section 7c is colored so that the number of execution times of the rinse operation or three times is indicated. The display section 7d is colored so that an execution time period of 7 minutes is indicated.

Figure 10:
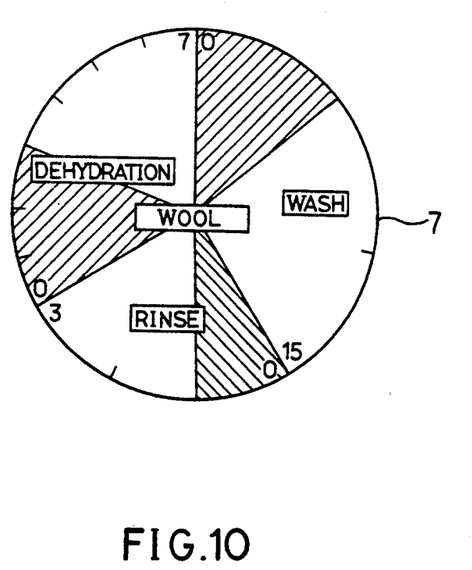
FIG. 10 is a plan view of the display unit displaying a WOOL course.
Figure 11:
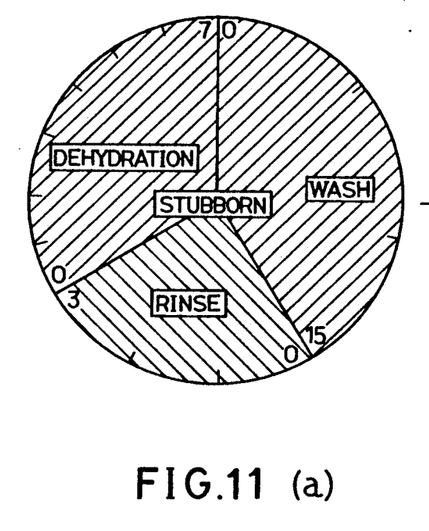
FIGS. 11(a)–11(c) are plan views sequentially showing the changes of the displayed contents when a WASH step is on display.
Figure 12:
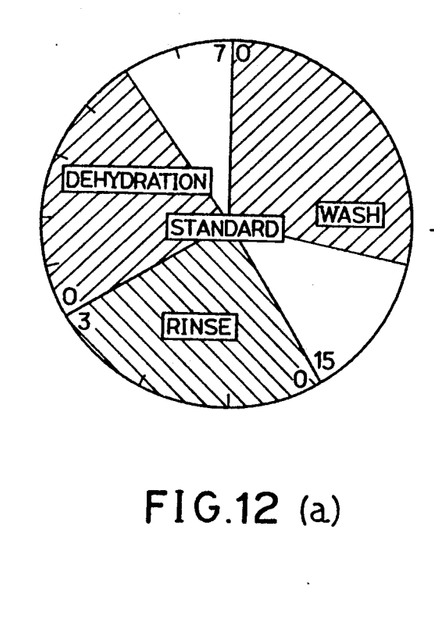
FIGS. 12(a)–12(c) are plan views sequentially showing the changes of the displayed contents when a RINSE course is on display.
Figure 13:
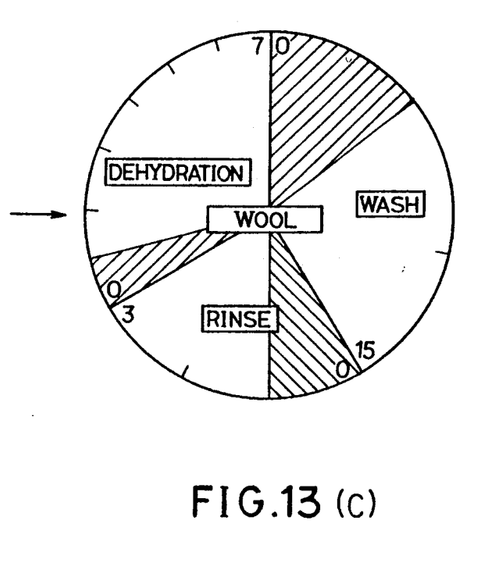
FIGS. 13(a)-13(c) are plan views sequentially showing the changes of the displayed contents when a DEHYDRATION course is on display.

Furthermore, when the display section 7a on which the washing-course name, STUBBORN is displayed is touched by the user or when the display section 7a on which the name of the washing course, STANDARD is displayed is touched continuously twice, this is detected by the touch detecting section 26. The control device 25 operates to switch the washing course from STUBBORN or STANDARD to WOOL and simultaneously, the name of the washing course, WOOL is displayed on the display unit 7. FIG. 10 illustrates the contents of the washing course, WOOL. The name of the washing course, WOOL, is displayed in the central display section 7a of the display screen of the display unit 7. The names of the steps to be executed or WASH, RINSE and DEHYDRATION are displayed on the circumferential display sections 7b–7d of the display screen respectively. Also, the display section 7b is colored so that an execution time period of 5 minutes is indicated. Further, the display section 7c is colored so that the number of execution times of the rinse operation or once is is indicated. The display section 7d is colored so that an execution time period of 3 minutes is indicated.

Additionally, when the display section 7a on which the washing-course name, WOOL is displayed is touched by the user or when the display section 7a on which the washing-course name, STUBBORN is displayed is touched continuously twice by the user, the control device 25 operates to switch the name of the displayed washing course from WOOL or STUBBORN to STANDARD and the name of the washing course, STANDARD is displayed on the display unit 7.

When the display section 7b on which the step name, WASH is on display is touched in the condition that any one of the washing courses has been set, the touching operation is detected by the touch detecting means 26. The control device 25 operates to reduce the time period of the WASH step in accordance with the number of times of the touch operation or the continuing time period of the touching operation. The display unit 7 displays the sequentially reduced time period of execution of the WASH step. FIGS. 11(a)–11(c) illustrate the changes in the images on the display screen of the display unit 7 in this case. The execution time period of the WASH step initially set at 15 minutes (a) is reduced to eight minutes (b) and subsequently, further reduced to three minutes.

On the other hand, when the display section 7c on which the step name, RINSE is on display is touched, this is detected by the touch detecting section 26. The control device 25 operates to reduce the number of times of execution of the RINSE step by the number of times corresponding to the number of times of the touch operations. The display unit 7 displays the reduced number of times of execution of the RINSE step. FIGS. 12(a)–12(c) illustrate the changes in the image displayed on the display unit 7. In this case, the number of times of execution of the RINSE step initially set at "three times" (a) in the washing course, STANDARD is reduced to "twice" (b) and further to "once" thereafter.

Furthermore, when the display section 7d on which the step name, DEHYDRATION is on display is touched, this is detected by the touch detecting section 26. The control device 25 operates to reduce the time period of execution of the DEHYDRATION step in accordance with the number of times corresponding to the number of times of the touch operations. The display unit 7 displays the sequentially reduced time period of execution of the DEHYDRATION step. FIGS. 13(a)–13(b) illustrate the changes in the image displayed on the display unit 7. In this case, the time period of execution of the DEHYDRATION step initially set at "three minutes" (a) in the washing course, WOOL is reduced to "two minutes" (b) and further to "one minute" thereafter.

When the time period of the WASH or DEHYDRATION step or the number of times of execution of the RINSE step is reduced to zero, the execution of the step is canceled. When the display screen section is further touched continuously, the value is returned to the maximum and the reducing operation is again initiated from the maximum value.

On the other hand, when it is determined at step S4 that no display screen section of the display unit 7 has been externally touched, it is determined whether the TIME key 8 or the RESERVE key 9 has been operated (step S6). When it is determined that either key has been operated, the control device 25 operates so that the display unit 7 displays the clock image in the analog mode as previously shown in FIG. 7. When the TIME key 8 is continuously depressed in this condition, the clock long needle advances by every scale of one minute and furthermore, the clock short needle advances by every scale of one hour. Consequently, the current time is set and it is displayed on the display unit 7. When the RESERVE key 9 is continuously depressed, the clock long needle and the short needle advance in the same manner as described above. Consequently, the time is set for the reserved operation and it is displayed on the display unit 7 (step S7).

Subsequently, it is determined whether the START key 13 has been operated or not (step S8). When it is determined that the START key 13 has been operated, the washing operation is started (step S9). During the washing operation, an area of the display screen allotted to each of the WASH and DEHYDRATION steps in execution is reduced sequentially by one minute with progress of each step. Further, an area of the display screen allotted to the RINSE step is reduced sequentially every time one rinse operation is completed. The power supply is automatically interrupted ten minutes after the completion of the washing operation (step S10). The display unit 7 is returned to the clock display mode in step S1.

The following effects can be achieved from the above-described arrangement. First, the executed contents of the washing course can be comprehended at a glance since the washing course including. sequential steps such as wash and rinse is displayed on the display unit 7. Second, the display section of the display unit 7 corresponding to each step is externally touched so that the contents of the step to be executed can be changed. Thus, the operation is direct and comprehensible. Third, the changes in the contents of the step to be executed are displayed on the display unit 7. Consequently, the changed contents of the step can be comprehended definitely. Fourth, separate keys for changing the contents of the step to be executed are not necessary and accordingly, the arrangement of these keys is not required in the operation panel, thereby rendering the operation panel section small. Consequently, the access opening 4 formed in the top cover 3 can be enlarged and the clothes can be put into and taken out of the wash tub 2 more readily. Fifth, since the clock is displayed on the display unit 7 in the analog mode, the momentary determination can be made more quickly than in the digital display mode.

Figure 14:
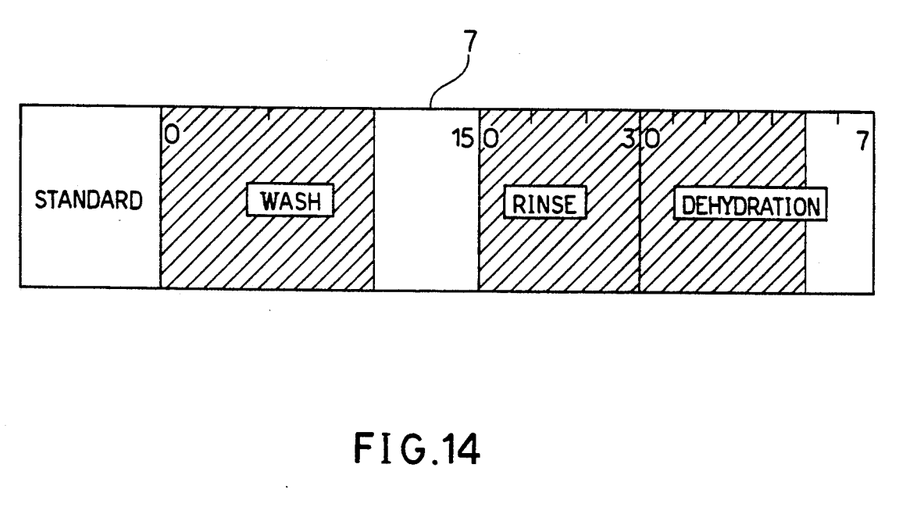
FIG. 14 is a view similar to FIG. 8 showing another embodiment of the invention.

The clock display mode may be employed only when it is necessary. When the clock display mode is not necessary, the washing course may be displayed in a band chart mode on a display unit 37, as is shown as another embodiment of the invention in FIG. 14.

Although the washing course is changed by changing the name of the washing course on display from one to another, it may be changed by operating a key provided separately from the display unit 7, 37, for example, the START/INTERRUPTION key 13. Furthermore, although the display sections 7a–7d are monochromatic in the foregoing embodiment, they may be colored by colors different from one another. In this case, operability and comprehension of the displayed contents can be improved.

The foregoing disclosure and drawings are merely illustrative of the principles of the present invention and are not to be interpreted in a limiting sense. The only limitation is to be determined from the scope of the appended claims.

We claim:

1. An operation panel for use in a washing machine, comprising:
   a) a display unit having a display screen on which contents of a washing course including wash and rinse steps is displayed;
   b) touch detecting means for detecting an external touch to a part of the display screen of the display unit, which part corresponds to each step of the washing course;
   c) means responsive to detection by the touch detecting means for selecting a desirable step and changing contents of a step on display from contents of a previously selected step to contents of a currently selected step; and
   d) means for controlling the display unit so that progress of the step in execution is displayed on the display screen of the display unit.

2. An operation panel according to claim 1, wherein the display screen of the display unit is divided into a plurality of display sections corresponding to the steps of the washing course respectively and the touch detecting means comprises switching elements disposed in the display sections of the display screen respectively. clock display instruction means controls the display unit in response to a suitable operation so that an analog clock pattern is displayed on the display screen, the analog clock pattern including images of clock short and long hands moved with progress of time.

3. An operation panel according to claim 2, wherein the display screen of the display unit has a display section on which the washing course indicative of the name of a washing operation is displayed and a switching element for selecting the washing course is disposed in the display section on which the name of the washing course is displayed.

4. An operation panel according to claim 2, wherein each switching element comprises transparent electrodes disposed on the display screen of the display unit.

5. An operation panel according to claim 2, wherein the display unit includes a liquid crystal display.

6. An operation panel according to claim 2, wherein the display screen of the display unit has a generally circular configuration and the display sections are circumferentially arranged on the display screen.

7. An operation panel according to claim 2, wherein the display screen of the display unit has the configuration of a band and the display sections are arranged longitudinally of the display screen.

8. An operation panel according to claim 2, wherein the progress of the step in execution is displayed in a pattern that an area of the display screen allotted to each step is changed with lapse of an execution time period of each step.

9. An operation panel according to claim 2, wherein the display sections are colored with different colors respectively except black and white.

10. An operation panel according to claim 1, further comprising clock display instruction means and wherein the display unit comprises a liquid crystal display and the clock display instruction means controls the display unit in response to a suitable operation so that an analog clock pattern is displayed on the display screen, the analog clock pattern including images of clock short and long hands moved with progress of time.

* * * * *